United States Patent [19]

Ingraham

[11] Patent Number: 5,284,238
[45] Date of Patent: Feb. 8, 1994

[54] VACUUM CONVEYOR FOR CANS

[75] Inventor: Thomas M. Ingraham, West Liberty, Ohio

[73] Assignee: Aluminum Company of America, Pittsburgh, Pa.

[21] Appl. No.: 995,187

[22] Filed: Dec. 22, 1992

[51] Int. Cl.⁵ .............................................. B65G 17/46
[52] U.S. Cl. ...................................... 198/689.1; 198/416; 198/735.3; 118/322; 118/64
[58] Field of Search ............... 198/471.1, 689.1, 836.1, 198/735.3, 416; 118/56, 64, 66, 232, 322

[56] References Cited

U.S. PATENT DOCUMENTS

| | | | |
|---|---|---|---|
| 2,759,588 | 8/1956 | Pettit | 198/735.3 X |
| 3,358,810 | 12/1967 | Zauner | 198/689.1 X |
| 3,454,282 | 7/1969 | Harrison et al. | 279/3 |
| 3,507,381 | 4/1970 | Deveres | 198/735.3 X |
| 3,921,575 | 11/1975 | Ishii et al. | 118/322 |
| 4,020,198 | 4/1977 | Cornelius et al. | 427/336 |
| 4,278,711 | 7/1981 | Sullivan | 427/284 |
| 4,348,816 | 9/1982 | Arippol | 198/416 X |
| 4,385,083 | 5/1983 | Shelley | 427/240 |
| 4,436,200 | 3/1984 | Hodlewsky et al. | 198/851 |
| 4,670,935 | 6/1987 | Bowler | 198/689.1 X |
| 4,673,080 | 6/1987 | Bartylla | 198/689.1 |
| 4,773,522 | 9/1988 | Lenhart | 198/689.1 X |
| 4,809,640 | 3/1989 | Pilley et al. | 118/257 |

Primary Examiner—James R. Bidwell
Attorney, Agent, or Firm—Thomas R. Trempus

[57] ABSTRACT

A rolling can conveyor includes an endless belt path and a flexible belt defining a plurality of openings therein for fluid communication therethrough. The flexible belt is operatively associated with the endless belt path such that the flexible belt is vertically oriented for at least a portion of the belt path. The bottom of the can body is held in contact with the flexible belt during transport by negative pressure. A guide rail extends along the vertically disposed flexible belt so as to support the can body. A plenum is operatively associated with the endless path proximate the guide rail. A vacuum is coupled to the plenum for applying a negative pressure sufficient to rotatably retain the can body in contact with the flexible belt and the guide rail, which imparts rotational motion to the can body about its longitudinal axis during transport.

19 Claims, 2 Drawing Sheets

VACUUM CONVEYOR FOR CANS

BACKGROUND OF THE INVENTION

1. Field of the Invention

This invention pertains to the art of transporting articles, generally and more particularly, to the transporting of can bodies during the can body manufacturing process. This invention provides an apparatus for translating articles, such as can bodies, in such a fashion as to impart a rotational motion to the can body along its longitudinal axis.

2. Description of Prior Art

It is the conventional practice in rolling can conveyors used in transporting can bodies from an internal spray machine to roll the can bodies between two pieces of polished sheet metal. When water-based materials are sprayed on the can bodies, the spray is deposited on the conveyors top guide due to contact with the can body. This buildup of material results in both a maintenance problem for the can conveyor system and ultimately a quality problem in the cans being conveyed thereon. While it is known to use a vacuum system in conveying cans, such a conveyance system transports the can bodies in an upright position. Thus, the enclosed, bottom domed can end rests on a horizontal member which, in turn, transports the upright can to a second location. As mentioned above, the existing machinery is designed to roll the can end bodies between sheets of metal. In addition to this problem, critical design tolerances are required in order to insure that the can body is not damaged during transport. U.S. Pat. No. 4,020,198 to J. W. Cornelius et al discloses the use of magnets or vacuum clamping of cans on a conveyor during a coating process. U.S. Pat. No. 3,358,810 to Q. Zauner teaches the use of a linked chain conveyor positioned on top of a vacuum chamber. A series of push rods are connected to a chain and move the articles held by vacuum on a pair of belts which are moved in a direction opposite the chain to cause the bottles being conveyed thereon to rotate.

SUMMARY OF THE INVENTION

In accordance with the broader aspects of the present invention, there is provided an apparatus for translating articles from an upstream location to a downstream location. The apparatus includes an endless belt path extending between locations. A flexible belt means which has a plurality of openings therein is operatively associated with the endless belt path. During at least a portion of the travel of the flexible belt means between the locations, the belt means is disposed vertically. A guide rail means extends between the upstream and downstream locations and is disposed near the flexible belt means so as to provide a spaced horizontal support relative to the belt means for an article being conveyed by the belt means. A plenum means is operatively associated with the endless belt path extending from the upstream location to the downstream location. Preferably, the plenum includes a first chamber and a second chamber in fluid communication with each other. A vacuum means is operatively coupled to the plenum means for creating a negative pressure therethrough wherein the vacuum is sufficient to retain an article on the flexible belt during translation between the upstream and downstream locations. Preferably, the plenum means includes a first plenum chamber operatively associated with the endless belt path and a second plenum means proximate the guide rail.

A vacuum of a value sufficient to retain an article on the belt means and to urge the article against the guide rail means is applied through the plenum chambers. During the transport of a cylindrical-shaped article such as can body, the closed can end is retained against the flexible belt means by the vacuum pressure. The side body of the can is urged against the guide rail. As the flexible belt means supports and conveys the can body from the first location to the second location, the contact of the can body with the guide rail imparts rotational movement to the can body. This configuration thus holds the can body with the can axis extending from the open first end to the closed second end in a horizontal disposition. The contact with the guide rail causes the can body to continuously roll as it is conveyed.

The apparatus of this invention is particularly well suited for conveying can bodies from a spray station to a drying station wherein, at the spray station, a coating is applied to the interior of the can body. Because this coating must be baked onto the can body, the can body once coated must be conveyed to a separate drying station. The instant conveyor system continuously rolls the can bodies during transport to the drying station to eliminate the potential pooling of the coating within the can body. The coating retains its uniform thickness about the interior of the can body. Moreover, the guide rail is disposed approximate the bottom or lower portion of the can body near the closed second end. Thus, no additional guide rail is required at or near the open end of the can, and the open end or edge of the can can be coated. There is thus no contact between the coated surface of the can body and the conveyance and guide system. The rolling action of the can bodies as they are being transported between the coating station and the drying station permits the application of a coating of uniform thickness on the can body as it enters the oven. The result is a product of higher quality and consistent standards.

Accordingly, it is an object of this invention to provide an apparatus for conveying can bodies from a first upstream location to a second downstream location.

It is a further object of this invention to provide a conveyor system which facilitates the complete uniform coating of the interior of a can body.

It is yet another object of this invention to provide a conveyance system which does not contact the open edge of a can body and thus does not interfere with the coating of that portion of the can body.

It is another object of this invention to provide an apparatus which imparts translational and rotational movement simultaneously to a can body.

It is yet another object of this invention to provide an apparatus with multiple lanes therein for the conveyance of a large number of can bodies at high speeds between work stations.

BRIEF DESCRIPTION OF THE DRAWINGS

The above as well as other features and advantages of the present invention can be more readily appreciated through consideration of the detailed description of the invention in conjunction with the attached drawings in which.

DETAILED DESCRIPTION OF A PREFERRED EMBODIMENT

Figure 1:
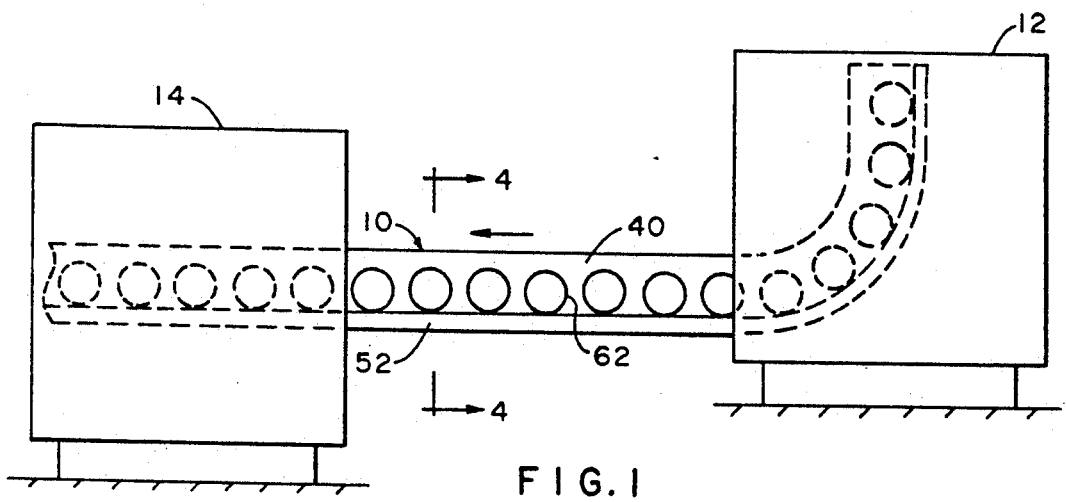
FIG. 1 is a schematic elevational representation of the conveyance system of this invention disposed between a can coating apparatus and a can drying apparatus showing a simple belt path.

While this invention is susceptible in embodiment in different forms, there is shown in the drawings and will herein be described in detail, one specific embodiment, with the understanding that the present disclosure is to be considered as an exemplification of the principals of the invention. It is not intended to limit the invention to the embodiment illustrated.

Turning now to FIG. 1, there is shown a schematic representation of a portion of a can body manufacturing facility. In this Figure, an apparatus for the conveyance of articles from a first location to a second location is generally indicated at the reference character 10. An upstream location typically consists of an apparatus for the application of a coating to the interior of a can body and is shown at 12. The downstream location is an oven 14 in which the coating on the interior of the can bodies is dried. Typically in conveying the can bodies from the upstream location to the downstream location, the conveyor 10 will move the can bodies in a horizontal direction.

Both can body coaters and driers are well known in the art of can body making.

The conveyance system of this invention is capable of being configured in single lane or multiple lane arrangements. The selection of the number of lanes to be used is based primarily on the number of body coaters feeding the conveyance system.

Figure 2:
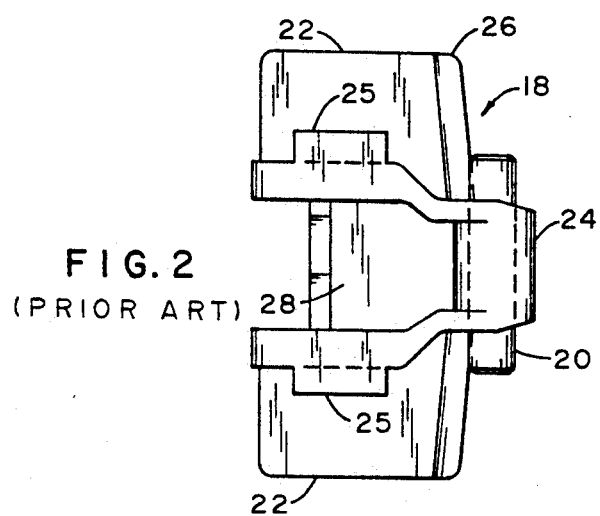
FIG. 2 is a plan view of the bottom side of a prior art link part used in the conveyor chain of this invention.
Figure 3:
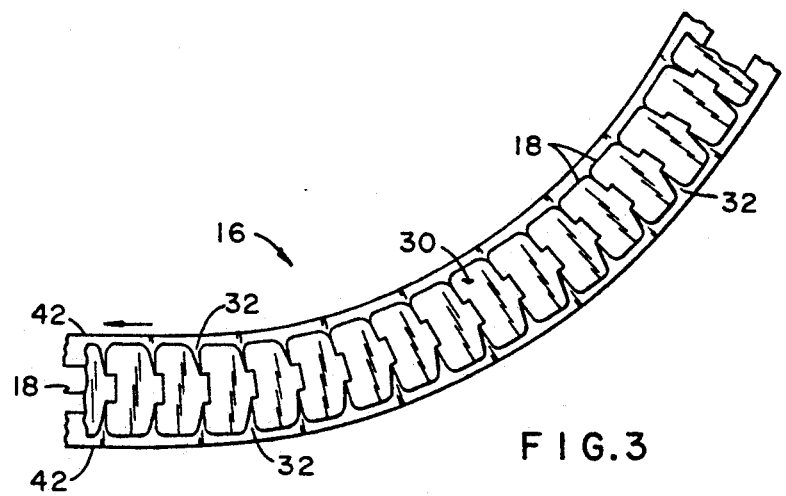
FIG. 3 is a plan view of reduced scale showing a curved section of an article conveyor using the conveyor chain described above.

The conveyor apparatus 10 of this invention uses a low friction flat-top article conveying chain prototype of the type shown in U.S. Pat. No. 4,436,200 to W. G. Hodlewsky et al, the contents of which are incorporated herein by reference. As will be readily appreciated, modifications to the chain design are possible with the key factors in chain selection being flexibility and a capacity to function with the vacuum system described below. As can be seen in FIGS. 2 and 3, the conveyor chain 16 includes a series of links 18 and a connecting pin 20. Each link 18 is of integral molded construction and includes two side members 22, the cross member or barrel 24 which joins the trailing ends 25 of the members 22 and the top plate 26 which overlies the barrel and cross members. The design and construction of the flexible belt 16 from the individual links 18 is ideally suited for use in the present invention. The flexibility of the belt and the multiple openings 32 between links provide ample opportunity for fluid communication from the underside 28 of the chain 16 to the conveying surface 30 thereof. Members of each link part 18 are arranged in plan so that their rear ends fit between the forward ends of the members of the following link whereby the adjacent links may be connected for articulation by the connecting pin 20. The links are interconnected so as to permit the lateral flexing of the belt as a result, the conveyor path may be curved where necessary or desired. Each two adjacent links are allowed to pivot within limits about a vertical axis which is at or near the center of the links. Spaced parallel guide rails 42 allow the side members 22 of the conveyor links to move freely therebetween and are of a suitable wear and corrosion resistant material for direct sliding engagement with the undersides of the sideward extending parts of the top plates 26 of the links 18. The guide rails determine the path of the conveyor.

Figure 4:
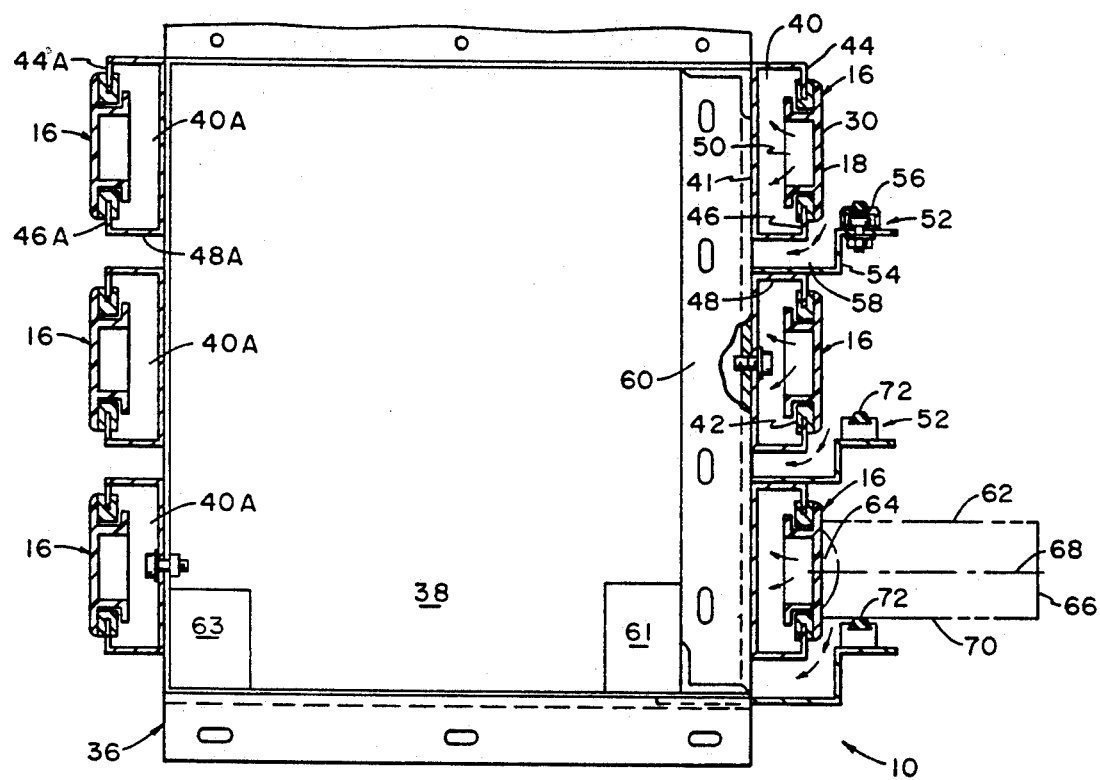
FIG. 4 is an elevational sectional view of an apparatus according to this invention taken on line 4—4 but supporting three endless belt paths.

Turning now to FIG. 4, a section through the conveyor apparatus 10 is shown respectively. The apparatus 10 includes a supporting structure 36 defining, in part, a housing 38 in which is supported vacuum generation means 61 and chain drive means 63 discussed below. An endless belt path generally indicated at 40 (FIG. 1) includes means 41 defining the belt path and extending between the upstream location 12 and the downstream location 14. Upper and lower guide means 44 and 46, respectively, are held in position by supporting member 48. In combination, the supporting member 48, the guides 44 and 46, and the chain 16 form a plenum chamber 50. The return path 40A is generally configured in the same structure as the path 40, however, as will be appreciated, the return path can be either vertical, as shown, or oriented as necessary.

A stationary guide rail 52 is mounted on angled support bracket 54. The stationary guide rail 52 is preferably a polyurethane V belt available from Fenner-Manheim. The stationary guide rail 52 can be supported by means of an extruded aluminum housing 56 which retains the V belt in a fixed position approximate the upper conveyance surface or first surface 30 of the chain 16. The angled support bracket 54, in combination with the housing 56 for the V belt, the V belt 51, and the supporting member 48 onto which the bottom guide 46 is mounted form a second plenum chamber 58.

Both the first plenum chamber 50 and the second plenum chamber 58 are in fluid communication with a vacuum manifold generally indicated at the reference character 60. The manifold 60 is in fluid communication with a vacuum pump means of conventional design schematically shown at 61. The vacuum means is sufficient to provide a negative pressure of approximately 4 inches of water column in both the first plenum chamber 50 and the second plenum chamber 58. The negative pressure can be established to be between about 0.5 and 6 inches of water column, however, 4.0 inches is preferred.

In operation, a vacuum is drawn on the first and second plenum chambers 50 and 58 which are in fluid communication with each other through manifold 60. This vacuum is maintained along the length of the endless belt path 40 as the belt travels from the upstream station 12 to the downstream station 14. A can body 62, which is conveyed from the upstream station to the downstream station, includes a first or bottom closed end 64 which is typically domed and a second open end 66. The first end and second ends, 64 and 66, define a horizontal axis 68 extending therethrough. The first end 64 is held against the upper conveyor surface 30 by the negative pressure caused by the vacuum. A continuous sidewall 70 of the can body 62 rides along the upper surface 72 of the stationary guide rail 52. The can body 62 is urged downwardly against the guide rail 52 by means of the vacuum created in the second plenum chamber 58. The vacuum is maintained in both the first and second plenum chambers so as to removably hold the can body against the upper conveyor surface and downwardly against the guide rail 52. Preferably, the gap between the upper conveyor surface 30 and the guide rail 52 is approximately 0.38 inch (0.96 cm). As the chain 16 travels along the endless belt path 40, the can body is retained against the upper conveyor surface 30, riding along the guide rail 52, such that rotational motion about the axis 68 of the can body 62 is imparted to the can body. In practice, the can body is being conveyed from a interior coating spray station at the upstream location 12. The rotational motion about the axis 68 imparted to the can body 62 eliminates any potential pooling of the fluid sprayed onto the interior of the can body. Additionally, because the guide rail 52 is disposed at what is the bottom of the can body 62 when the can body is situated in an upright, normal position, no damage is done to the coating at the open end 66 of the can body. Thus, the interior of the can body can be coated completely. The return path 40A includes guides 44A and 46A supported by bracket 48A which support the chain 16. Neither the guide rails 52 or vacuum system components are required for the return path. A flexible belt drive means 63 of conventional design is schematically shown to be operatively associated with the flexible belt or chain 16.

The can bodies can be fed onto the conveyor belt and removed therefrom by conventional means not illustrated herein. A preferred embodiment of the present invention has been described and illustrated herein to present the principals of the invention, while it is understood that numerous modifications may be made without departing from the spirit and scope of the invention as set forth in the claims.

What is claimed is:

1. An apparatus for transporting from an upstream location to a downstream location an article having a generally cylindrical body portion with a first end and a second end defining a longitudinal axis extending through said body portion, comprising:
    means defining an endless belt path extending between the upstream location and the downstream location;
    flexible belt means having a first surface and an opposed second surface defining a plurality of openings therein for fluid communication therethrough, operatively associated with said means defining an endless belt path such that said first surface is vertically oriented for at least a portion of the belt path from said upstream location to said downstream location, wherein the article's first end is in contact with the first surface during transport;
    guide rail means extending from the upstream location to the downstream location and disposed proximate said flexible belt means so as to support the article body portion proximate said flexible belt means first surface;
    a first plenum means operatively associated with said means defining an endless path and extending from the upstream location to the downstream location;
    a second plenum means proximate said guide rail means operatively associated with said guide rail means; and
    vacuum means operatively coupled to said first and second plenum means for applying a negative pressure therethrough wherein the vacuum from said first plenum means is sufficient to rotatably retain the article first end in contact with said flexible belt means first surface and the vacuum from said second plenum means is sufficient to maintain contact of the article body portion with said guide rail means, such contact imparting rotational motion to the article about the longitudinal axis thereof during transport.

2. The apparatus according to claim 1 wherein the first and second plenum means are in fluid communication with each other.

3. The apparatus according to claim 1 wherein the vacuum means maintains a pressure of between 0.5 and 6 inches of water column.

4. The apparatus according to claim 1 wherein the guide rail means is a stationary member.

5. The apparatus according to claim 1 wherein the upstream station is an apparatus for the application of a fluid coating to the article.

6. The apparatus according to claim 1 wherein the upstream station is an apparatus for the application of a fluid coating to the article and the downstream station is an apparatus for the drying of the fluid coating.

7. The apparatus according to claim 1 wherein the first plenum means and second plenum means are in fluid communication one with the other and the vacuum maintains a pressure of about 4 inches of water column.

8. The apparatus according to claim 1 wherein the means defining the endless belt path include flexible belt drive means operatively associated with the flexible belt.

9. An apparatus for translating articles from an upstream location to a downstream location, said articles having a first end and a second end with a longitudinal axis extending therethrough such that said longitudinal axis becomes an axis of rotation of said article during transport, comprising:
    means defining an endless belt path extending between the upstream location and the downstream location;
    flexible belt means having a plurality of openings therein for fluid communication therethrough and upon which the articles are supported, said belt means being vertically oriented for at least a portion of the travel between said upstream location and said downstream location;
    guide rail means extending from the upstream location to the downstream location and disposed proximate said flexible belt means so as to provide horizontal support to the article at a location proximate said flexible belt means;
    plenum means operatively associated with said means defining an endless path and extending from the upstream location to the downstream location; and
    vacuum means operatively coupled to said plenum means for applying a negative pressure therethrough wherein the vacuum is sufficient to rotatably retain the article on said flexible belt means during translation while the article is supported on said guide rail.

10. The apparatus according to claim 9 wherein the means defining an endless belt path extending between the upstream location and the downstream location is operatively associated with said flexible belt means such that said flexible belt means is vertically oriented from said upstream location to said downstream location.

11. The apparatus according to claim 9 wherein the plenum means comprises a first plenum means and a second plenum means in fluid communication, one with the other.

12. The apparatus according to claim 11 wherein the first plenum means is operatively associated with the means defining an endless path extending from the upstream location to the downstream location.

13. The apparatus according to claim 11 wherein the second plenum means is proximate the guide rail means.

14. The apparatus according to claim 11 wherein the vacuum means is operatively coupled to the first and second plenum means for applying a vacuum pressure therethrough.

15. The apparatus according to claim 11 wherein the vacuum means maintains a pressure of about 4 inches of water column.

16. The apparatus according to claim 9 wherein the article is a cylindrical container having an enclosed first end and on opposed second end.

17. The apparatus according to claim 9 wherein the upstream station is an apparatus for the application of a fluid coating to the article.

18. The apparatus according to claim 9 wherein the upstream station is an apparatus for the application of a fluid coating to the article and the downstream station is an apparatus for the drying of the fluid coating.

19. The apparatus according to claim 9 wherein the means defining the endless belt path include flexible belt drive means operatively associated with the flexible belt.

* * * * *